United States Patent
Noda

(10) Patent No.: US 8,502,508 B2
(45) Date of Patent: Aug. 6, 2013

(54) SWITCHING REGULATOR CIRCUIT CONFIGURED TO PERFORM STEP UP AND STEP DOWN OPERATIONS AND OPERATION METHOD THEREFOR

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 12/912,275

(22) Filed: Oct. 26, 2010

(65) Prior Publication Data
US 2011/0109289 A1    May 12, 2011

(30) Foreign Application Priority Data
Nov. 11, 2009    (JP) .................................. 2009-258229

(51) Int. Cl.
   *G05F 1/00*          (2006.01)
(52) U.S. Cl.
   USPC .......................................... 323/222; 323/282
(58) Field of Classification Search
   USPC ................................................. 323/222, 282
   See application file for complete search history.

(56) References Cited

U.S. PATENT DOCUMENTS

| | | | |
|---|---|---|---|
| 6,194,880 B1 * | 2/2001 | Fraidlin et al. ................. | 323/222 |
| 7,733,068 B2 | 6/2010 | Noda | |
| 2004/0056642 A1 * | 3/2004 | Nebrigic et al. ............... | 323/284 |
| 2007/0222502 A1 | 9/2007 | Noda | |
| 2008/0111423 A1 * | 5/2008 | Baker et al. ..................... | 307/64 |
| 2009/0066305 A1 | 3/2009 | Noda | |
| 2009/0115374 A1 | 5/2009 | Noda | |
| 2010/0060250 A1 | 3/2010 | Noda | |
| 2011/0090717 A1 * | 4/2011 | Lee et al. ................... | 363/21.02 |

FOREIGN PATENT DOCUMENTS

| | | |
|---|---|---|
| CN | 1451200 A | 10/2003 |
| CN | 101232201 A | 7/2008 |
| JP | 3787785 | 4/2006 |
| JP | 2008-131746 | 6/2008 |
| JP | 2008-199804 | 8/2008 |
| JP | 4233037 | 12/2008 |
| JP | 2009-71920 | 4/2009 |
| JP | 2009-130972 | 6/2009 |
| JP | 2009-219179 | 9/2009 |
| JP | 2009-258809 | 11/2009 |
| JP | 2009-261048 | 11/2009 |

(Continued)

OTHER PUBLICATIONS

Chinese official action dated Dec. 28, 2012 in connection with corresponding Chinese patent application No. 201010535758.7.

Primary Examiner — Adolf Berhane
Assistant Examiner — Emily Pham
(74) Attorney, Agent, or Firm — Cooper & Dunham LLP

(57) ABSTRACT

A switching regulator circuit for achieving stepping-up or stepping-down, including a basic circuit and an inductor connected to the basic circuit. The basic circuit includes a switching circuit to perform switching, a control circuit to control the switching circuit, a first terminal connected to one end of the inductor and the switching circuit, and second and third terminals connected to the switching circuit. When the input voltage is stepped up, the control circuit causes the switching circuit to charge the inductor via the first terminal and the third terminal and to discharge the inductor via the first terminal and the second terminal. When the input voltage is stepped down, the control circuit causes the switching circuit to charge the inductor via the first terminal and the second terminal and to discharge the inductor via the first terminal and the third terminal.

15 Claims, 6 Drawing Sheets

FOREIGN PATENT DOCUMENTS

| | | |
|---|---|---|
| JP | 2009-303317 | 12/2009 |
| JP | 2010-51079 | 3/2010 |
| JP | 2010-51152 | 3/2010 |
| JP | 2010-63333 | 3/2010 |
| JP | 2010-68553 | 3/2010 |
| JP | 2010-154716 | 7/2010 |

* cited by examiner

SWITCHING REGULATOR CIRCUIT CONFIGURED TO PERFORM STEP UP AND STEP DOWN OPERATIONS AND OPERATION METHOD THEREFOR

BACKGROUND OF THE INVENTION

1. Field of the Invention

The present invention relates to a switching regulator circuit that converts an input voltage to a predetermined voltage by stepping up or by stepping down an input voltage.

2. Description of the Related Art

Certain switching regulator circuits can convert an input voltage to a predetermine voltage in a step-up operation or in a step-down operation. FIG. 1 illustrates circuitry of a related art step-up (booster)/step-down (buck) switching regulator (switch-mode power supply circuit) circuit 111, as disclosed in Japanese patent no. 3,787,785 (JP-3787785-B).

In FIG. 1, when the input voltage Vin is higher than an output voltage Vout, a switching regulator circuit 111 charges an inductor 110 via a switch 116 and discharges the inductor 110 via a switch 118 so that an output voltage Vout is set to a predetermined step-down value. In addition, when the input voltage Vin is lower than the output voltage Vout, the switching regulator circuit 111 charges the inductor 110 via a switch 136 and discharges the inductor 110 via a switch 134 so that the output voltage Vout is set to a predetermined step-up value. The switching regulator circuit 111 includes a prefix circuit 112, a step-up circuit 114, and a triangular wave generation circuit 30. The prefix circuit 112 includes a low pass filter (LPF) 130, an input terminal IN, and a control circuits 120 that includes a reference voltage generation circuits 124, an error amplification circuit 122, a pulse width modulation (PWM) comparator 126, and an inverters 128. The step-up circuit 114 includes an output terminal OUT, a smoothing capacitor Co, and a control circuit 138 that includes an error amplification circuit 140, a PWM comparator 142, and an inverter 143. The error amplification circuit 140 includes a resistor division circuit 144, a current output amplification circuit 146, an output circuit 148, and a reference voltage generation circuit 150.

The switching regulator circuit 111 shown in FIG. 1 adjusts the output voltage Vout to the predetermined voltage, regardless of the relative magnitudes of the input voltage Vin and the output voltage Vout. Therefore, the switching regulator 111 can adapt to both systems in which the input voltage Vin is higher than the output voltage Vout and those in which the input voltage Vin is lower than the output voltage Vout.

However, the switching regulator circuit 111 requires a switching circuit that automatically switches the step-up control and step-down control, therefore, the circuit size increases. In addition, the configuration of the control circuit becomes complicated.

Further, in the related-art step-up/step-down switching regulator circuit 111, because the switch 116 is provided in the path through which the current is supplied from an input terminal IN to which the input voltage Vin is inputted even though the switch 116 is not required in the step-up operation, a switching loss occurs in the switch 116. Similarly, because the switch 134 is provided in the path through which the current is supplied to an output terminal OUT from which the output voltage Vout is outputted even though the switch 134 is not required in the step-down operation, a switching loss occurs in the switch 134.

In view of the foregoing, there is market demand for a switching regulator circuit that can avoid reduction in switching conversion efficiency and has a simple configuration with the number of the elements in the entire circuit reduced.

SUMMARY OF THE INVENTION

In view of the foregoing, one illustrative embodiment of the present invention provide a switching regulator circuit to step up or step down an input voltage to a predetermined voltage. The switching regulator circuit includes an inductor and a basic circuit to which the inductor is connected. The basic circuit includes a switching circuit to perform switching, a control circuit to control the switching circuit, a first terminal connected to one end of the inductor and the switching circuit, a second terminal connected to the switching circuit, and a third terminal connected to the switching circuit. When the input voltage is stepped up, the control circuit causes the switching circuit to charge the inductor via the first terminal and the third terminal and to discharge the inductor via the first terminal and the second terminal. When the input voltage is stepped down, the control circuit causes the switching circuit to charge the inductor via the first terminal and the second terminal and to discharge the inductor via the first terminal and the third terminal.

Another illustrative embodiment of the present invention provides a method of operating a switching regulator circuit described above. The method of operation includes controlling the switching circuit when the input voltage is stepped up and controlling the switching circuit when the input voltage is stepped down. When the input voltage is stepped up, controlling the switching circuit includes charging the inductor via the first terminal and the third terminal and discharging the inductor via the first terminal and the second terminal. When the input voltage is stepped down, controlling the switching circuit includes charging the inductor via the first terminal and the second terminal and discharging the inductor via the first terminal and the third terminal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
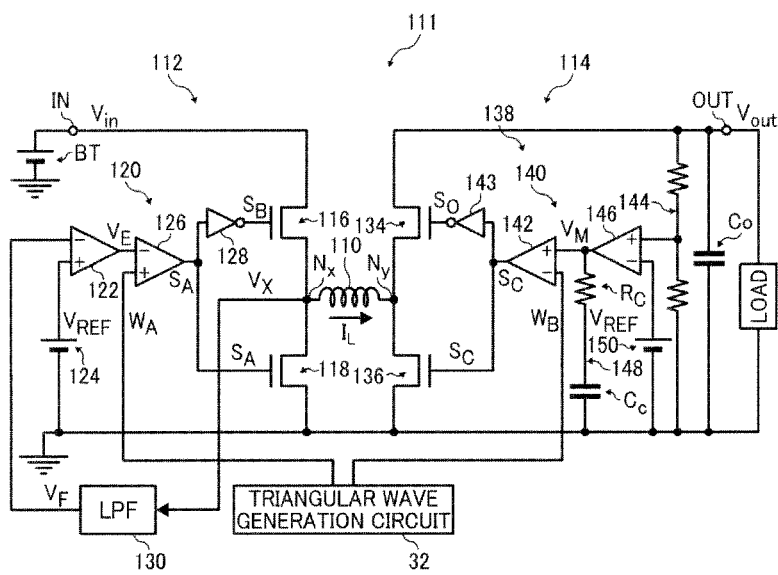
FIG. 1 illustrates circuitry of a related-art switching regulator circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIGS. 2A through 4B, a switch-mode power supply circuit 1 (hereinafter, switching regulator) according to a first embodiment of the present invention is described below.

(General Configuration of Switching Regulator Circuit)

Figure 2A:
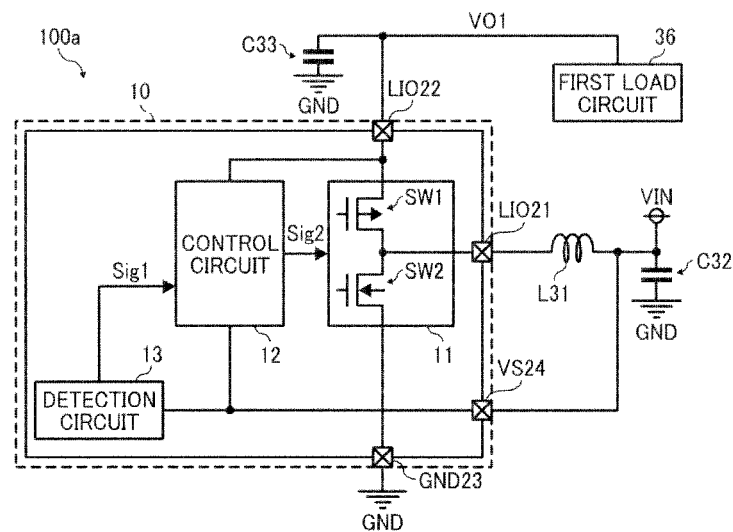
FIGS. 2A and 2B show circuitry of a switching regulator circuit according to an illustrative embodiment of the present invention.
Figure 2B:
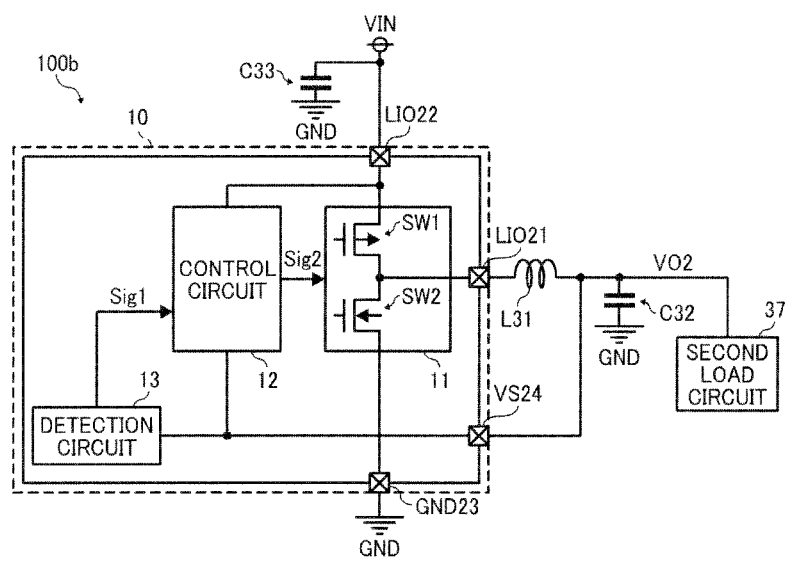

FIG. 2A illustrates circuitry of a step-up (booster) switching regulator circuit 100a that converts an input voltage into a predetermined voltage by stepping up the input voltage to output the converted voltage. FIG. 2B illustrates circuitry of a step-down (buck) switching regulator circuit 100b that converts an input voltage into a predetermined voltage by stepping down the input voltage to output the converted voltage. The respective switching regulator circuits 100a and 100b include an identical basic circuit 10 and an inductor L31, capacitors C32 and C33, an input terminal IN, and each of load circuits 36 and 37, which are externally connected to the basic circuit 10.

Figure 3:
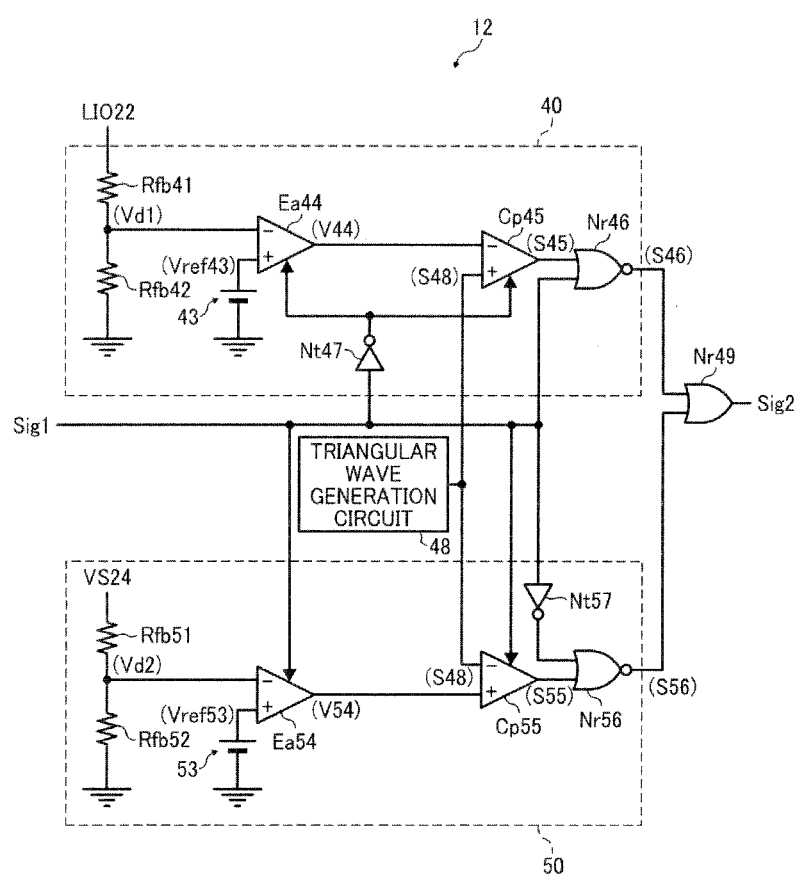
FIG. 3 shows circuitry of a control circuit in the switching regulator circuit.

FIG. 3 shows circuitry of a control circuit 12 included in the basic circuit 10 in both the step-up switching regulator circuit 100a and the step-down switching regulator circuit 100b.

(Configuration of the Step-up Switching Regulator Circuit)

As shown in FIG. 2A, the step-up switching regulator circuit 100a includes the basic circuit 10. The basic circuit 10 includes a switching circuit 11, the control circuit 12, and a detection circuit 13. The basic circuit 10 further includes a first terminal LIO21 connected to one end of the inductor L31, a second terminal LIO22 connected to the capacitor C33 and the first load circuit 36, through which the inductor L31 is discharged, and a third terminal GND23 is grounded (connected to the ground terminal GND), through which the inductor L31 is charged. The first terminal LIO21, the second terminal LIO22, and the third terminal GND23 are connected to the switching circuit 11. The switching circuit 11 includes a first switch SW1 and a second switch SW2. The first switch SW1 is connected between the first terminal LIO21 and the second terminal LIO22, and the second switch SW2 is connected between the first terminal LIO21 and the third terminal GND23. It is preferable that the first switch SW1 and the second switch SW2 are formed of metal oxide semiconductor (MOS) transistors.

The other end of the inductor L31 is connected to the input terminal IN to which the input voltage VIN is inputted and the capacitor C32, and the junction node among them is connected to the detection circuit 13 via a terminal VS24 in the basic circuit 10. A detection signal Sig1 detected in the detection circuit 13 is inputted to the control circuit 12. A control signal Sig2 from the control circuit 12 is inputted to the switching circuit 13. It is to be noted that the capacitor C32 is connected to the input terminal IN to stabilize the input voltage VIN.

In FIG. 3, the control circuit 12 includes a step-up control circuit 40, a step-down control circuit 50, a triangular wave generation circuit 48, and an output circuit Nr49. The step-up control circuit 40 includes a first error-amplification circuit Ea44, a first comparator Cp45, a first NOR circuit Nr46, a second NOT circuit Nt47, a first reference voltage source 43, a first resistor Rfb41, and a second resistor Rfb42. The step-up control circuit 40 serves as a first control sub-circuit.

In the step-up control circuit 40, the input voltage VIN1 inputted from the second terminal LIO22 is divided by the first and second resistors Rfb41 and Rfb42 to generate a divided voltage Vd1. The divided voltage Vd1 and a first reference voltage Vref43 generated in the first reference voltage source 43 are inputted to the first error-amplification circuit Ea44. The first error-amplification circuit Ea44 generates and outputs a first error-amplified voltage V44. The first error-amplified voltage V44 and a triangular wave signal S48 generated in the triangular wave generation circuit 48 are inputted to the first comparator Cp45. The first comparator Cp45 compares the first error-amplified voltage V44 and the triangular wave signal S48 and outputs a compared signal S45 as the comparison result. Then, the compared signal S45 and the detection signal Sig1 from the detection circuit 13 are inputted to the first NOR circuit Nr46. An output from the first NOR circuit Nr46, that is, an output signal S40 of the step-up control circuit 40, is inputted to the output circuit Nr49.

When the divided voltage Vd1 is lower than the first reference voltage Vref43, the first error-amplification circuit Ea44 increases the error-amplified voltage V44. On the other hand, when the divided voltage Vd1 is higher than the first reference voltage Vref43, the first error-amplification circuit Ea44 decreases the error-amplified voltage V44. In addition, when the first error-amplified voltage V44 is lower than the triangular wave signal S48, the first comparator Cp45 outputs a high level signal "H", and, when the first error-amplified voltage V44 is higher than the triangular wave signal S48, the first comparator Cp45 outputs a low level signal "L".

Similar to the step-up control circuit 40, in lower portion shown in FIG. 3, the step-down control circuit 50 includes a second error-amplification circuit Ea54, a second comparator Cp55, a second NOR circuit Nr56, a first NOT circuit Nt57, a second reference voltage source 53, a third resistor Rfb51, and a fourth resistor Rfb52. The step-down control circuit 50 serves as a second control sub-circuit. In the step-down control circuit 50, the input voltage VIN2 inputted from the terminal VS24 is divided by the third and fourth resistors Rfb51 and Rfb52 to generate a divided voltage Vd2. The divided voltage Vd2 and a second reference voltage Vref53 generated in the second reference voltage source 53 are inputted to the second error-amplification circuit Ea54. The second error-amplification circuit Ea54 generates and outputs a second error-amplified voltage V54. The second error-amplified voltage V54 and the triangular wave S48 generated in the triangular wave generation circuit 48 are inputted to the second comparator Cp55. The second comparator Cp55 compares the second error-amplified voltage V54 and the triangular wave signal S48 and outputs a compared signal S55 as the comparison result. Then, the compared signal S55 and the detection signal Sig1 from the detection circuit 13 are inputted to the second NOR circuit Nr56. An output signal S56 from the second NOR circuit Nr56, that is, an output signal S50 of the step-down control circuit 50, is inputted to the output circuit Nr49.

It is to be noted that the second error-amplification circuit Ea54 and the second comparator Cp55 have similar circuit configurations, which are described later.

(Operation of the Step-up Switching Regulator Circuit)

Next, operation of the step-up switching regulator circuit 100a is described below.

Figure 4A:
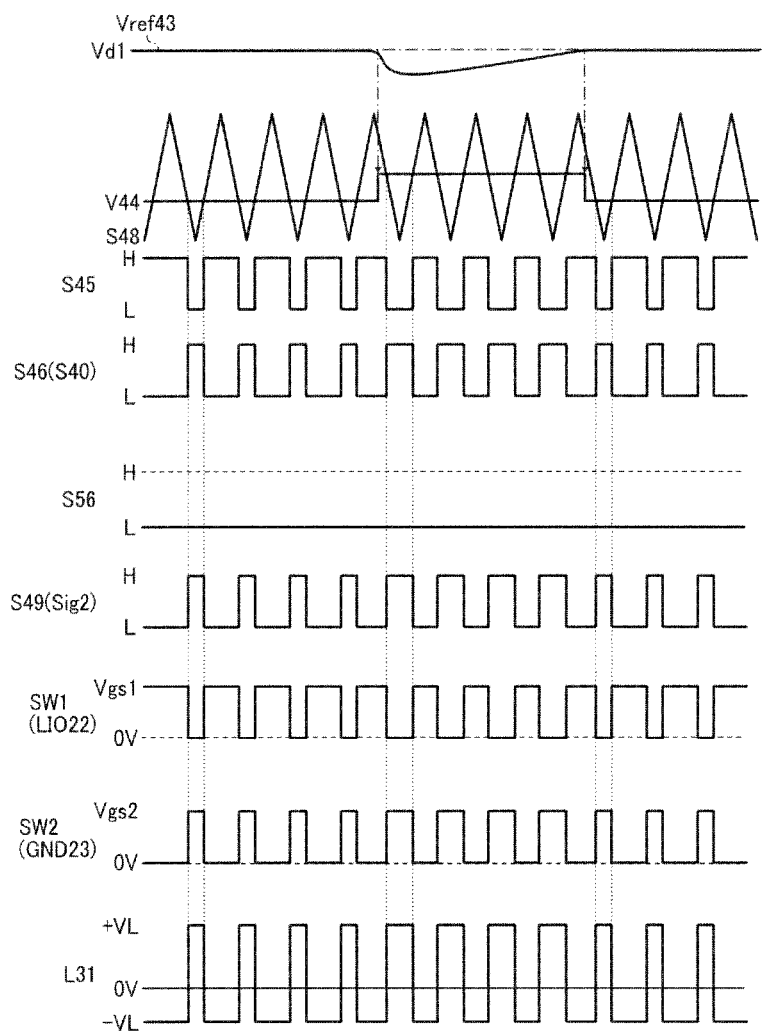
FIGS. 4A and 4B are timing charts illustrating operation of the control circuit in the power supply circuit.

FIG. 4A is a timing chart illustrating operation of the step-up switching regulator circuit 100a shown in FIG. 2A. Referring to FIGS. 3 and 4A, when the detection circuit 13 of the basic circuit 10 included in the step-up switching regulator circuit 100a detects that the input voltage VIN1 is inputted to the terminal VS24, the detection circuit 13 turns the detection signal Sig1 low level and inputs it to the control circuit 12.

At this time, in the control circuit 12 shown in FIG. 3, when the detection signal Sig1 is turned to low level, the operation of the second amplification circuit Ea54 and the second comparator Cp55 is stopped. In addition, an output signal S57 of the first NOT circuit Nt57 becomes high level, and accordingly, the second NOR circuit Nr56 constantly outputs a low level signal (S56). Therefore, only the step-up control circuit 40 operates in the control circuit 12, and the output signal S40 of the step-up control circuit 100a becomes the control signal Sig2 output from the control circuit 12.

At this time, the step-up control circuit 40 retrieves an output voltage VO1 during step-up operation via the second terminal LIO2 and the output voltage VO1 is divided by the first resistor Rfb41 and the second resistors Rfb42 to generate the divided voltage Vd1. Then, the divided voltage Vd1 is inputted to the first error-amplification circuit Ea44. The first error-amplification circuit Ea44 sets the error-amplified voltage V44 higher when the divided voltage Vd1 divided from the output voltage VO1 is lower than the first reference voltage Vref43. By contrast, the first error-amplification circuit Ea44 sets the error-amplified voltage V44 lower when the divided voltage Vd1 is higher than the first reference voltage Vref43. The first comparator Cp45 compares the first error-amplified voltage V44 and the triangular wave signal S48 and outputs the comparison result as the output signal (compared signal) S45 that shows their relative magnitudes. The output signal S45 showing the relative magnitudes therebetween is inputted to the output circuit Nr49 via the first NOR circuit Nr46.

More specifically, when the output voltage V44 of the first error amplification circuit Ea44 is higher than the triangular wave signal S48 generated in the triangular wave generation circuit 48, the output signal S45 from the first comparator Cp45 turns low, and accordingly, the output circuit Nr49 outputs a high level control signal (Sig2) "H". At this time, the first switch SW1 of the switching circuit 11 shown in FIG. 2A is turned off, and the second switch SW2 is turned on. Then, the inductor L31 is connected between the input terminal IN and the third terminal GND23, thereby charging the inductor L31.

For example, if first switch SW1 and the second switch SW2 are formed of respective a first MOS transistor and a second MOS transistor, then, as shown in FIG. 4A, the first switch MOS transistor SW1 is turned off, and a driving voltage thereof becomes 0 V. By contrast, the second switch MOS transistor SW2 is tuned on, and the driving voltage thereof is set to a gate-source voltage Vgs2 of the second switch MOS transistor SW2. Therefore, a positive inductor voltage +VL is applied to the inductor L31, thus charging the inductor via the third terminal GND23 and the first terminal LIO21 connected to the input terminal VIN.

On the other hand, when the output voltage V44 of the first error-amplification circuit Ea44 is lower than the triangular wave signal S48 generated in the triangular wave generation circuit 48, the output signal S45 from the first comparator Cp45 becomes high, and accordingly, an output signal S49 (Sig2) from the output circuit Nr49 becomes high. At this time, the first switch SW1 of the switching circuit 11 is turned on, and the second switch SW2 is turned off. Then, the inductor L31 is connected between the input terminal IN and the second terminal LIO22, thereby discharging the inductor L31.

For example, first switch SW1 and the second switch SW2 are formed of a first MOS transistor and a second MOS transistor, respectively. As shown in FIG. 4A, at this time, the first switch MOS transistor is turned on, and thus, a driving voltages thereof is set to a gate-source voltage Vgs1 of the first switch MOS transistor SW1. By contrast, the second switch MOS transistor SW2 is tuned on, and thus, the driving voltage thereof is set to 0 V. Therefore, a negative inductor voltage −VL is applied to the inductor L31, thus discharging the inductor L31 via the first terminal LIO21 connecting to the input terminal VIN and the second terminal LIO22.

With this circuit configuration, in the step-up switching regulator circuit 100a shown in FIG. 2A and the control circuit 12 shown in FIG. 3, when the output voltage VO1 is decreased, the divided voltage Vd1 is lower than the first reference voltage Vref43. Then, as the output voltage V44 of the first error-amplification circuit Ea44 is increased, a period during which the first error-amplified voltage V44 is higher than the triangular wave signal S48 of the triangular wave generation circuit 48 becomes longer. Then, a period during which the inductor L31 is charged becomes longer, and the output voltage VO1 is increased and thus regulated to the predetermined voltage.

By contrast, in the step-up switching regulator circuit 100a, when the output voltage VO1 is increased, the divided voltage Vd1 of the output voltage VO1 becomes higher than the first reference voltage Vref43. Then, as the output voltage V44 of the first error-amplification circuit Ea44 is decreased, a period during which the first error-amplified voltage V44 is higher than the triangular wave signal S48 becomes shorter. Then, a period during which the inductor L31 is discharged becomes longer, and the output voltage VO1 is regulated to step down and return to the predetermined voltage.

Therefore, the input voltage VIN is stepped up to a predetermined output voltage value.

As described above, when the step-up switching regulator circuit 100a operates, the step-down control circuit 50 stops operation and does not consume power. In addition, the step-down control circuit 50 constantly outputs a low level signal (S50) to the output circuit Nr49, which does not disturb the operation of the step-up control circuit 40.

(Configuration of the Step-down Switching Regulator Circuit)

Next, the circuit configuration of the step-down switching regulator circuit 100b is described below with reference to FIGS. 2B and 3.

As shown in FIG. 2B, similar to the step-up switching regulator circuit 100a, the step-down switching regulator circuit 100b includes the basic circuit 10 that includes the switching circuit 11, the control circuit 12, and the detection circuit 13.

The basic circuit 10 includes a first terminal LIO21 connected to one end of the inductor L31, a second terminal LIO22 connected to an input terminal IN and charging the inductor L31, and a third terminal GND23 is grounded (GND) and discharging from the inductor L31. The first terminal LIO21, the second terminal LIO22, and the third terminal GND 23 are connected to the switching circuit 11. The switching circuit 11 includes the first switch SW1 and the second switch SW2. The first switch SW1 is connected between the first terminal LIO21 and the second terminal LIO22, and the second switch SW2 is connected between the first terminal LIO21 and the third terminal GND23. Similar to the switching circuit 11 shown in FIG. 2A, it is preferable that the first switch SW1 and the second switch SW2 are formed of metal oxide semiconductor (MOS) transistors.

The other end of the inductor L31 is connected to the second load circuit 37 and the capacitor C32, and a junction node between the second load circuit 37 and the capacitor C32 is connected to the detection circuit 13 via the terminal VS24 of the basic circuit 10. The detection signal Sig1 detected in the detection circuit 13 is inputted to the control circuit 12. The control signal Sig2 from the control circuit 12 is inputted to the switch circuit 11. It is to be noted that the capacitor C32 is connected to stabilize the output voltage VIN Namely, although the step-up switching regulator circuit 100a and the step-down switching regulator circuit 100b include the basic circuit 10 and are similar configuration, the difference between the step-up switching regulator circuit 100a and the step-down switching regulator circuit 100b is that a terminal to connect to the input terminal IN is switched from the first terminal LIO21 to the second terminal LIO22, and the junction node and the load are switched from the first load circuit 36 to the second load circuit 37

The control circuit 12 in the step-down switching regulator circuit 100b shown in FIG. 2B includes the same circuits included in the control circuit 12 in the step-up switching regulator circuit 100a, which is shown in FIG. 3.

(Operation of the Step-down Switching Regulator Circuit)

Next, operation of the step-down switching regulator circuit 100b shown in FIG. 2B is described below.

Figure 4B:
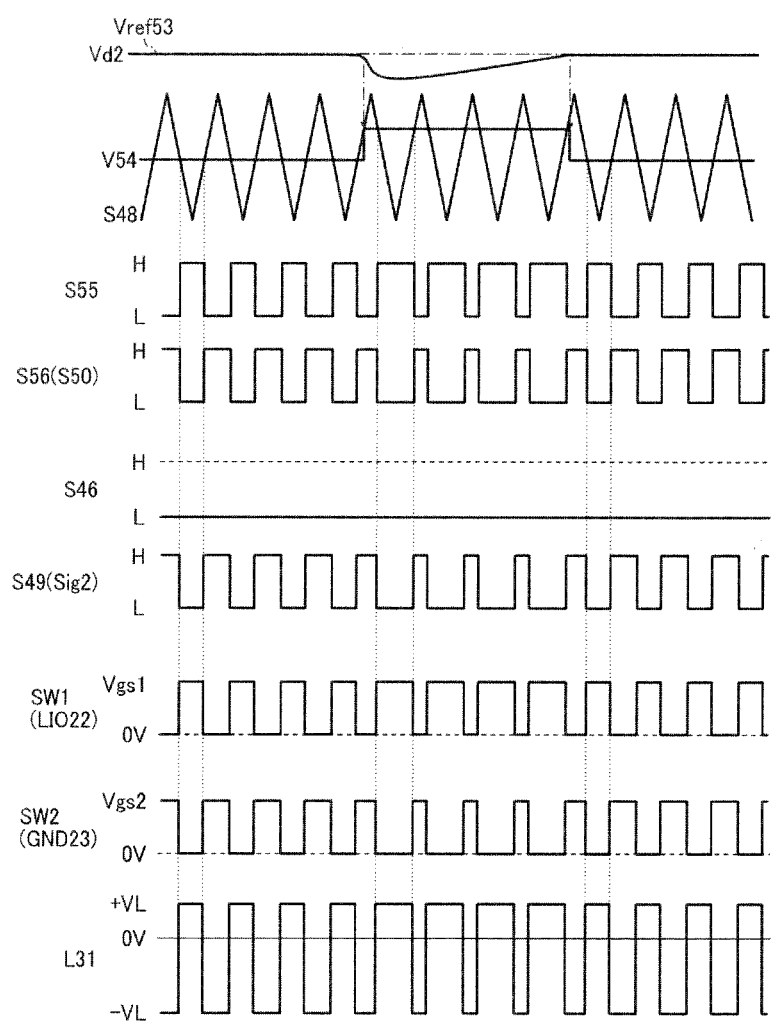

FIG. 4B is a timing chart illustrating operation of the step-down switching regulator circuit 100b shown in FIG. 2B. Referring to FIGS. 3 and 4B, when the detection circuit 13 of the basic circuit 10 included in the step-down switching regulator circuit 100b detects that the input voltage VIN is not inputted to the terminal VS24, the detection circuit 13 turns the detection signal Sig1 low level and inputs it to the control circuit 12.

At this time, in the control circuit 12 shown in FIG. 3, when the detection signal Sig1 is turned to high level, the low level signal of a second NOT signal S47 from the second NOT circuit Nt47 is applied to the first error-amplification circuit Ea44 and the first comparator Cp45, thereby, the operation of the first error-amplification circuit Ea44 and the first comparator Cp45 is stopped. In addition, when the detection signal Sig1 becomes high, the first NOR circuit Nr46 constantly outputs a low level signal (S46). Therefore, only the step-down control circuit 50 operates in the control circuit 12, and the output signal S56 of the step-down control circuit 50 functions as the control signal Sig2 of the control circuit 12.

At this time, the step-down control circuit 50 retrieves an output voltage VO2 during step-down operation via the terminal VS24, the output voltage VO2 is divided by the third resistor Rfb51 and the fourth resistors Rfb52 to generate the divided voltage Vd2. Then, the divided voltage Vd2 is inputted to the second error-amplification circuit Ea54. The error-amplification circuit Ea54 sets a second error-amplified voltage V54 relatively higher when the divided voltage Vd2 divided from the output voltage VO2 is lower than the second reference voltage Vref53. By contrast, the second error-amplification circuit Ea54 sets the error-amplified voltage V54 relatively lower when the divided voltage Vd2 is higher than the second reference voltage Vref53. The second comparator Cp55 compares the error-amplified voltage V54 and the triangular wave signal S48 and outputs the comparison result as a compared signal S55 that shows magnitude of relation between them. The output signal S55 showing the magnitude of the relation therebetween is inputted to the output circuit Nr49 via the second NOR circuit Nr56.

More specifically, when the output voltage V54 of the second error-amplification circuit Ea54 is higher than the triangular wave signal S48 generated in the triangular wave generation circuit 48, the output signal S55 generated in the second comparator Cp55 becomes low, and accordingly, the output signal S56 of the second NOR circuit Nr56 becomes high. Accordingly, the output circuit Nr49 outputs a high level control signal Sig2. At this time, the first switch SW1 of the switching circuit 11 shown in FIG. 2B is turned on, and the second switch SW2 is turned off. Then, the inductor L31 is connected to the input terminal IN and the first terminal LIO21, thereby charging the inductor L31.

For example, assume that the first switch SW1 and the second switch SW2 are formed of a first MOS transistor and a second MOS transistor, respectively. At this time, as shown in FIG. 4B, the first switch MOS transistor SW1 is turned on, and thus a driving voltages thereof is set to a gate-source voltage Vgs1 of the first switch MOS transistor SW1. By contrast, the second switch MOS transistor SW2 is tuned off, and thus the driving voltage thereof is set to 0 V. Therefore, a positive inductor voltage +VL is applied to the inductor L31 discharged via the second terminal LIO22 connecting to the input terminal IN and the first terminal LIO21, thus charging the inductor L31.

In addition, when the output voltage V54 of the second error-amplification circuit Ea54 is lower than the triangular wave S48 generated in the triangular wave generation circuit 48, the output signal S55 from the second comparator Cp55 becomes low, and accordingly, the output signal S49 (control signal Sig2) of the output circuit Nr49 becomes high. At this time, when the first switch SW1 of the switching circuit 11 shown in FIG. 2B is turned off, and the second switch SW2 is turned on. Then, the inductor L31 is connected to the input terminal IN and the third terminal GND23, thereby discharging the inductor L31.

For example, first switch SW1 and the second switch SW2 are formed of respective a first MOS transistor and a second MOS transistor. At this time, as shown in FIG. 4A, the first switch MOS transistor SW1 is turned off, and a driving voltages thereof becomes 0 V, and the second switch MOS transistor SW2 is tuned on, and the driving voltage thereof is set a gate-source voltage Vgs2 of the second switch MOS transistor SW2. Therefore, a negative inductor voltage −VL is applied to the inductor L31 via the first terminal LIO21 and the third terminal GND23, thus discharging the inductor L31.

With this circuit configuration, in the step-down switching regulator circuit 100b shown in FIG. 2B and the control circuit 12 shown in FIG. 3, when the output voltage VO2 is decreased, and accordingly the divided voltage Vd2 is lower than the second reference voltage Vref53. Then, as the output voltage V54 of the second error-amplification circuit Ea54 is increased, a period during which the second error-amplified voltage V54 is higher than the triangular wave signal S48 becomes longer. Then, a period during which the inductor L31 is charged becomes longer, and the output voltage VO2 is increased and thus regulated to the predetermined voltage.

By contrast, in the step-down switching regulator circuit 100b, when the output voltage VO2 is increased and the divided voltage Vd2 of the output voltage VO2 becomes higher than the second reference voltage Vref53, a period during which the output voltage V54 of the second error-amplification circuit Ea54 is higher than the triangular wave signal S48 becomes shorter. Then, a period during which the inductor L31 is discharged becomes longer, and the output voltage VO2 is decreased and thus regulated to the predetermined voltage. Therefore, the input voltage VIN is constantly stepped down to a predetermined output voltage value.

As described above, when the step-down switching regulator circuit 100b operates, the step-up control circuit 40 stops operation and does not consume power. In addition, the step-up control circuit 40 constantly outputs the low level signal S40 to the output circuit Nr49, which does not disturb the operation of the step-down control circuit 50.

(Operation Based on Relative Sizes of Input Voltage and Output Voltage)

In light of the relative sizes of the input voltage and output voltage, the operation of the switching regulator circuit according to the present embodiment is as follows.

When the switching regulator circuit 100 according to the present embodiment is used for a system in which the output voltage is set higher than the input voltage in advance, the circuit configuration of the step-up switching regulator circuit 100a including the basic circuit 10 is adopted. In this case, the detection circuit 13 detects that the input voltage VIN is supplied to the terminal VS24, and the detection signal Sig1 of the detection circuit 13 is set to low level to be inputted to the control circuit 12.

At this time, when the detection signal Sig1 is set to low level in the control circuit shown in FIG. 2, the second error-amplification circuit Ea54 and the second comparator Cp55 stop operation, and the first NOT circuit Nt57 constantly outputs a high level signal, and the second NOR circuit Nr56 constantly outputs a low level signal (S56). Accordingly, only the step-up control circuit 40 operates in the control circuit 12 and the output signal S40 of the step up control circuit 40 functions as the output signal Sig2 of the control circuit 12. Therefore, the step-up control circuit 40 turns the output voltage VO2 higher than the input voltage VIN.

By contrast, when the switching regulator circuit 100 according to the present embodiment is used for a system in which the output voltage is set lower than the input voltage in advance, the circuit configuration of the step-down switching regulator circuit 100b including the basic circuit 10 is adopted.

In this case, the detection circuit 13 detects that the input voltage VIN is not supplied to the terminal VS24, and the detection signal Sig1 of the detection circuit 13 is set to high level to be inputted to the control circuit 12. At this time, when the detection signal Sig1 is set to high level in the control circuit shown in FIG. 2, the first error amplification circuit Ea4 and the first comparator Cp45 stop operation in the step-up control circuit 40, and therefore the first NOR circuit Nr46 constantly output a low level signal (S46). Accordingly, only the step-down circuit 50 operates in the control circuit 12 and the output signal S50 of the step-down circuit 50 functions as the output signal Sig2 of the control circuit 12. Therefore, the step-down control circuit 50 adjusts the output voltage VO2 to be lower than the input voltage VIN and outputs the voltage VO2 to the switching circuit 11.

As described above, because the step-up switching regulator circuit 100a and the step-down switching regulator circuit 100b includes the basic circuit 10, and the entire circuit configuration is similar, the same switching regulator circuit can operate as the step-up switching regulator circuit 100b and the step-down switching regulator circuit 100a. Therefore, development and manufacturing of the switching regulator circuit can be streamlined.

In addition, although a comparative example of a switching regulator circuit includes a switch for stepping down that may degrade the conversion efficiency during stepping up and a switch for stepping up that may degrade the conversion efficiency during stepping down, the switching regulator circuit according to the present embodiment does not have this problem. That is, the switching regulator circuit according to the present embodiment does not include unnecessary circuitry, and therefore, degradation of conversion efficiency caused from the unnecessary circuit can be prevented.

(Second Embodiment)

Next, a second embodiment according to this patent specification is described below.

Figure 5A:
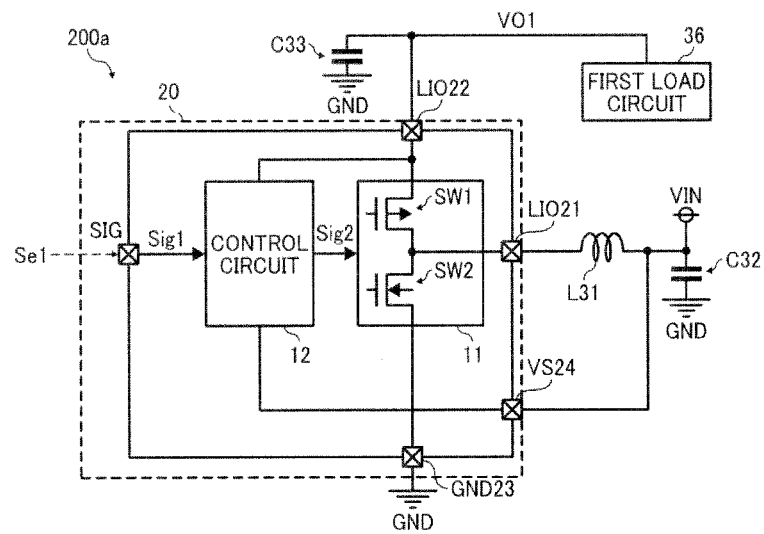
FIGS. 5A and 5B show circuitry of a switching regulator circuit according to another embodiment.
Figure 5B:
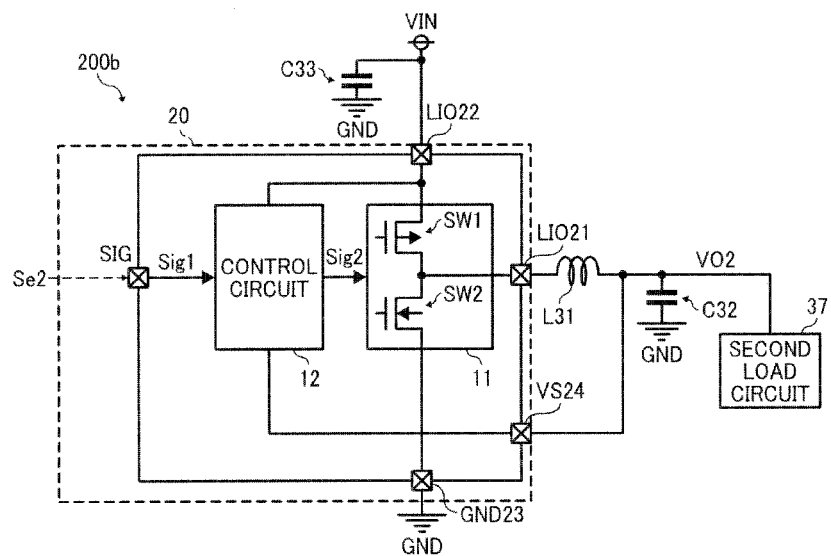

Similarly to FIGS. 2A and 2B, FIG. 5A illustrates circuitry of a step-up (booster) switching regulator circuit 200a in which an input voltage VIN is increased to output as an output voltage VO1 and FIG. 5B illustrates circuitry of a step-down (buck) switching regulator circuit 200b in which an input voltage VIN is decreased to output as an output voltage VO2. The step-up switching regulator circuit 200a and the step-down switching regulator circuit 200b include the basic circuit 20, and overall both circuit configurations are similar.

It is to be noted that, for ease of explanation and illustration, because other than the difference described below the switching regulator circuit 200 has a configuration similar to the configuration of the switching regulator circuit 100 in the first embodiment, these other components of the switching regulator circuit 200 are represented by identical numerals and the description thereof is omitted below.

The difference between the switching regulator circuit 200 and the switching regulator circuit 100 is that the basic circuit 20 according to the present embodiment includes a control signal input terminal SIG instead of the detection circuit 13. More specifically, the control circuit 20 can switch between the step-up operation and the step-down operation by inputting an externally arbitrary signal (a first control signal Se1 or a second control signal Se2) via the control signal input terminal SIG as an external signal Sig1

In the switching regulator circuit shown in FIGS. 2A and 2B if noise is generated, that noise may cause the detection circuit 13 to malfunction, and the control circuit 12 malfunctions by receiving the wrong signal Sig1 outputted from the detection 13. However, in this embodiment, the occurrence of such a malfunction can be prevented.

Numerous additional modifications and variations are possible in light of the above teachings. It is therefore to be understood that, within the scope of the appended claims, the disclosure of this patent specification may be practiced otherwise than as specifically described herein.

This patent specification claims priority from Japanese Patent Application No. 2009-258229, filed on Nov. 11, 2009 in the Japan Patent Office, which is hereby incorporated by reference herein in its entirety.

What is claimed is:

1. A switching regulator circuit configured to perform step up and step down operations to convert an input voltage to a predetermined output voltage, the switching regulator circuit comprising:

an inductor; and
a basic circuit to which the inductor is connected,
the basic circuit comprising:
a switching circuit to perform switching;
a control circuit to control the switching circuit;
a first terminal connected to one end of the inductor and the switching circuit, an external load being connectable to the switching circuit through the first terminal;
a second terminal connected to the switching circuit and connectable to another external load; and
a third terminal connected to the switching circuit,
wherein the control circuit is configured to perform a step up operation to boost the input voltage by outputting a boosted output voltage to said another external load connected to the second terminal, by charging the inductor via the first terminal and the third terminal and discharging the inductor via the first terminal and the second terminal, and
wherein the control circuit is configured to perform a step down operation to drop the input voltage and output a dropped output voltage to the external load connected through the first terminal, by charging the inductor via the first terminal and the second terminal and discharging the inductor via the first terminal and the third terminal, and
wherein the basic circuit further comprises a detection circuit to detect whether the input voltage is applied to an end of the inductor opposite the first terminal or whether the input voltage is applied to the second terminal, the control circuit is configured to perform the step up operation when the detection circuit detects that the input voltage is applied to the end of the inductor opposite the first terminal, and the control circuit is configured to perform the step down operation when the detection circuit detects that the input voltage is applied to the second terminal.

2. The switching regulator circuit of claim 1, wherein the control circuit of the basic circuit comprises:

a first control sub-circuit that controls the switching circuit in the step-up operation; and a second control sub-circuit that controls the switching circuit in the step-down operation.

3. The switching regulator circuit of claim 2, wherein the switching circuit of the basic circuit comprises:

a first MOS transistor, connected between the first terminal and the second terminal; and a second MOS transistor, connected between the first terminal and the third terminal, wherein, when the step up operation is performed, the inductor is charged by turning the second MOS transistor on and discharged by turning the first MOS transistor on, and when the step down operation is performed, the inductor is charged by turning the first MOS transistor on and discharged by turning the second MOS transistor on.

4. The switching regulator circuit of claim 3, wherein the second control sub-circuit in the control circuit stops operation when the step up operation is performed, and the first control sub-circuit in the control circuit stops operation when the step down operation is performed.

5. The switching regulator circuit of claim 3, wherein an output of the first control sub-circuit is outputted from the control circuit when the step up operation is performed, and an output of the second control sub-circuit is outputted from the control circuit when the step down operation is performed.

6. The switching regulator circuit of claim 1, wherein the control circuit is configured to perform the step up operation to boost the input voltage by supplying the input voltage to the first terminal via the inductor, and the control circuit is configured to perform the step down operation to drop the input voltage by supplying the input voltage to the second terminal.

7. The switching regulator circuit of claim 1, wherein the basic circuit further comprises a control signal input terminal, the control circuit is configured to perform the step up operation when the control signal input terminal receives a first control signal, and the control circuit is configured to perform the step down operation when the control signal input terminal receives a second control signal different from the first control signal.

8. The switching regulator circuit of claim 7, wherein the first control signal and the second control signal are inputted to the control signal input terminal externally and arbitrarily.

9. The switching regulator circuit of claim 1, wherein the control circuit of the basic circuit controls the switching circuit to convert the input voltage to the predetermined output voltage and supply the predetermined output voltage at the second terminal when the step up operation is performed, and controls the switching circuit to supply the predetermined output voltage at an end of the inductor opposite the first terminal when the step down operation is performed.

10. A method of operating a switching regulator circuit that converts an input voltage to an output voltage, the switching regulator circuit including an inductor, a switching circuit, a control circuit, a first terminal connected to one end of the inductor and the switching circuit and through which an external load is connectable to the switching circuit, a second terminal connected to the switching circuit and connectable to another external load; and a third terminal connected to the switching circuit, the method of operating comprising:

controlling the switching circuit to perform a step up operation to boost the input voltage by outputting the output voltage to said another external load connected to the second terminal, by performing the steps of, charging the inductor via the first terminal and the third terminal, and discharging the inductor via the first terminal and the second terminal; and controlling the switching circuit to perform a step down operation to drop the input voltage by outputting the output voltage to the external load connected through the first terminal, by performing the steps of, charging the inductor via the first terminal and the second terminal, and discharging the inductor via the first terminal and the third terminal, wherein the switching regulator circuit includes a detection circuit, the method of operating further comprising:

controlling the switching circuit to perform the step up operation when the detection circuit detects that the input voltage is input at an end of the inductor opposite the first terminal, and controlling the switching circuit to perform the step down operation when the detection circuit detects that the input voltage is input at the second terminal.

11. The method of operating the switching regulator circuit of claim 10, wherein the control circuit includes a first control sub-circuit and a second control sub-circuit and wherein the switching circuit includes a first MOS transistor connected between the first terminal and the second terminal and a second MOS transistor connected between the first terminal and the third terminal, the method of operating further comprising:

controlling the switching circuit by the first control sub-circuit to perform the step up operation, by performing the steps of, charging the inductor by turning the second MOS transistor on, and discharging the inductor by turning the first MOS transistor on; and controlling the switching circuit by the second control sub-circuit to perform the step down operation, by performing the steps of, charging the inductor by turning the first MOS transistor on, and discharging the inductor by turning the second MOS transistor on.

12. The method of operating the switching regulator circuit of claim 11, further comprising:

stopping the second control sub-circuit when the step up operation is performed; and stopping the first control sub-circuit when the step down operation is performed.

13. The method of operating the switching regulator circuit of claim 11, further comprising:

outputting an output signal from the first control sub-circuit when the step up operation is performed; and outputting an output signal from the second control sub-circuit when the step down operation is performed.

14. The method of operating the switching regulator circuit of claim 10, further comprising:
supplying the predetermined output voltage at the second terminal when the step up operation is performed; and
supplying the predetermined output voltage at an end of the inductor opposite the first terminal when the step down operation is performed.

15. The method of operating the switching regulator circuit of claim 10, wherein the switching regulator circuit includes a control signal input terminal,
the method of operating further comprising:
controlling the switching circuit to perform the step up operation when the control signal input terminal receives an external first control signal; and
controlling the switching circuit to perform the step down operation when the control signal input terminal receives an external second control signal different from the external first control signal.

* * * * *